United States Patent
Allain et al.

(10) Patent No.: US 8,474,756 B2
(45) Date of Patent: Jul. 2, 2013

(54) SYSTEM FOR FIXING

(75) Inventors: Julien Allain, Toulouse (FR); Samuel Burgunder, Toulouse (FR); Christophe Mialhe, Giroussens (FR)

(73) Assignee: Airbus Operations S.A.S., Toulouse (FR)

( * ) Notice: Subject to any disclaimer, the term of this patent is extended or adjusted under 35 U.S.C. 154(b) by 912 days.

(21) Appl. No.: 12/578,988

(22) Filed: Oct. 14, 2009

(65) Prior Publication Data

US 2010/0108808 A1    May 6, 2010

(30) Foreign Application Priority Data

Oct. 14, 2008 (FR) ...................................... 08 05669

(51) Int. Cl.
*B64D 13/00* (2006.01)

(52) U.S. Cl.
USPC ..................... 244/118.6; 244/122 R; 410/104

(58) Field of Classification Search
USPC .... 244/118.6, 122 R; 410/104, 101; 248/429, 248/500, 503
See application file for complete search history.

(56) References Cited

U.S. PATENT DOCUMENTS

| 3,241,501 | A | * | 3/1966 | Watts ............................. 410/105 |
| 3,306,234 | A | * | 2/1967 | Hansen et al. ................... 410/55 |
| 5,433,550 | A | * | 7/1995 | Huber ............................ 403/348 |
| 5,791,502 | A | * | 8/1998 | Bietz et al. ..................... 211/192 |
| 7,455,276 | B2 | * | 11/2008 | Frey ................................ 248/500 |
| 7,837,145 | B2 | * | 11/2010 | Wodak ........................ 244/118.6 |
| 8,251,623 | B2 | * | 8/2012 | Marechal ...................... 410/105 |
| 2005/0247820 | A1 | | 11/2005 | Feist et al. |
| 2005/0258676 | A1 | | 11/2005 | Mitchell et al. |

FOREIGN PATENT DOCUMENTS

| DE | 102 36 076 A1 | 2/2004 |
| DE | 10 2004 039 189 A1 | 2/2006 |

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

This system makes it possible to join a substantially flat base of an element to be fixed to a top plate. It is provided with: at least one hole of elongated shape made in the top plate, a shaft extending substantially perpendicular to the base of the element to be fixed and mounted movable in rotation relative to its longitudinal axis, a fixation head of elongated shape matched to the shape of the hole made in the top plate and disposed on a first side of the base of the element to be fixed, control means for making the shaft pivot around its axis and disposed, relative to the fixation head, on the other side of the base of the element to be fixed.

13 Claims, 5 Drawing Sheets

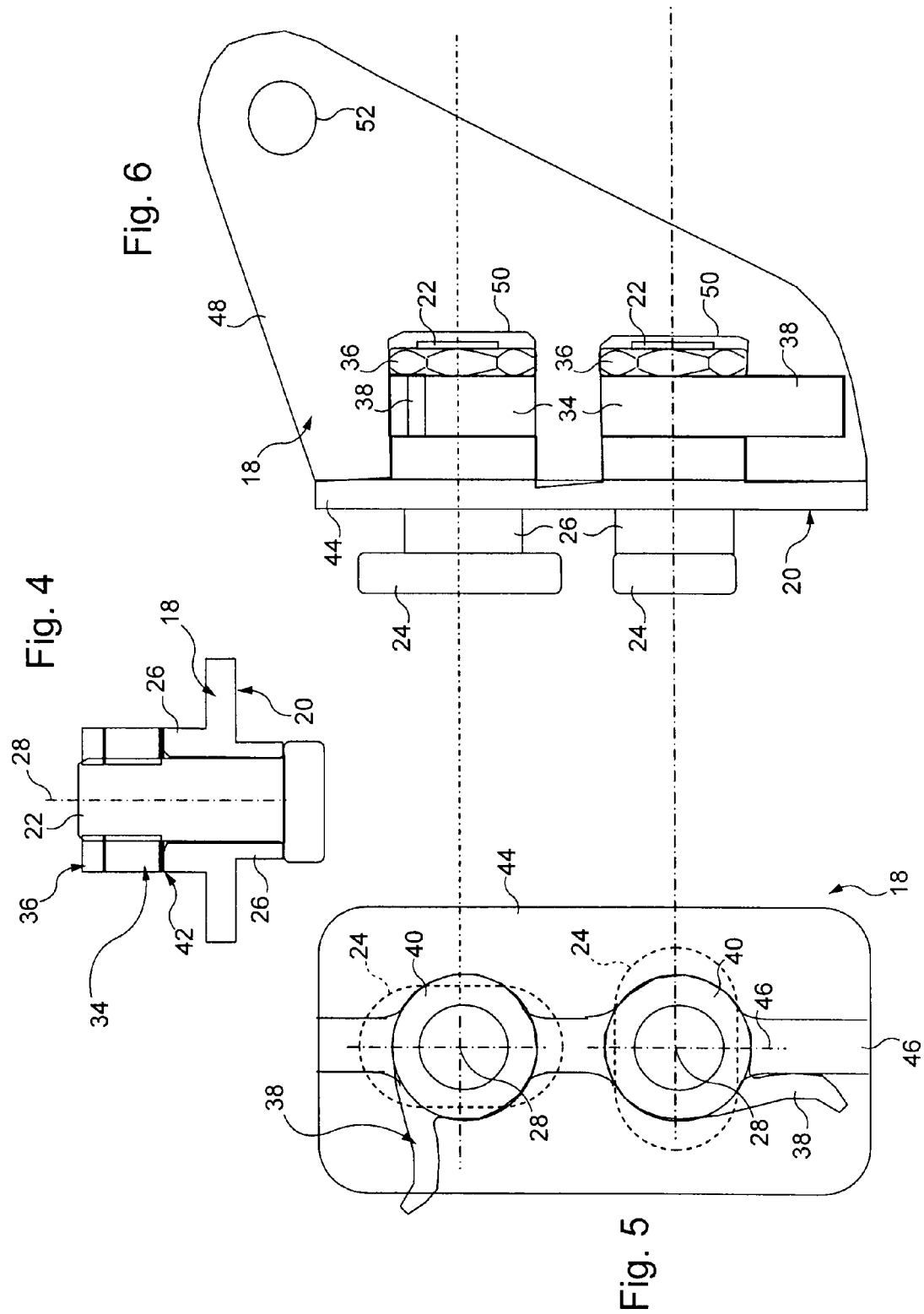

SYSTEM FOR FIXING

FIELD

The present invention relates to a fixation system, intended in particular for fixation of furnishing components in a vehicle and more particularly in an aircraft.

BACKGROUND

An aircraft for commercial purposes, used for transportation of passengers, is usually provided with a cabin equipped with seats to accommodate the passengers. The cabin floor is usually equipped with longitudinal rails, which are used to fix the seats but also other elements such as walls or furnishing components, also known as monuments.

In original manner, the present invention not only relates to fixation of diverse elements on the floor of an aircraft cabin but also it can relate to fixation of stowage bins or other elements at the ceiling of an aircraft cabin. A fixation system according to the present invention may also find an application in the hold of an aircraft for fixation of cabinets or technical elements.

The fixation rails for aircraft seats traditionally have regularly spaced anchoring points, with a pitch of generally one inch (25.4 mm). A rail of this type used in modern airplanes has the form, for example, of an I-beam topped by a projecting part, in which there is made a track used for fixation of seats (or other elements). Access to the track is possible via a longitudinal slot, which has circular apertures that are regularly spaced at the aforesaid pitch and have a diameter larger than the width of the slot.

To achieve fixation of a seat (or other element), there is used a bolt having a head and an externally threaded shaft. The head of the bolt is introduced through a circular aperture in the bottom of the track then is slid along until it is located between two neighboring circular apertures. In this way a seat fastening can be fixed on the rail by screwing it onto the externally threaded shaft with a nut or thumb wheel.

Usually the rail is made of aluminum or of an aluminum-base alloy. The fastening is most often made of steel. Corrosion problems then occur, especially in humid environments, due to the galvanic couple between aluminum and steel. In addition, liquids may pool in the track and favor such corrosion.

The solution adopted to avoid these corrosion problems is to make the rails of titanium or of a titanium-base alloy. However, this solution leads on the one hand to a large additional cost and on the other hand to a disadvantage in terms of weight.

It also is noted that the prior art fixation systems make the steps of mounting and demounting seats difficult. This leads to disadvantages during the cycles of installing and removing seats both during manufacture of the aircraft and during reconfiguration of the cabin in an operational aircraft.

Finally, the projecting part of the fixation rail, in which there is made the track used for anchoring seats, forms a raised structure at the cabin floor, and this must be taken into account for the covering of the cabin floor.

US document 2005/0211836 describes a seat-fixation system for an aircraft. This system can be fitted onto prior art rails or else onto new rails. This system is provided with a base having at least one clamping arm that is movable relative to the fixation rail between a position that permits passage through an aperture made in the rail and a locked position in which the arm cannot come out of the said aperture. Locking is achieved by means of a moveable lug associated with the base. Such locking is achieved in particular by threaded joints.

That document provides means for achieving mechanical anchoring of a seat on a fixation rail. The proposed systems necessitate several mounting and fixation operations. It is appropriate firstly to place the clamping arms in "open" position, then to move them to their "closed" position before completing the locking operation, for example by threaded joints. In addition, that document does not disclose any means with which an electrical connection can be established at the same time as the mechanical connection is established.

To improve passenger comfort on board an aircraft, it is becoming increasingly necessary to provide electrical cabling to the seats. This cabling may be used for auxiliary lighting, for electrical supply from an outlet, etc. Electrical cabling may also be necessary for sending information (calling a flight attendant, for example) and for permitting the passengers to access the Internet, for example, or to power a screen for showing a film, etc.

SUMMARY

The objective of the present invention is then to provide a fixation system making it possible to eliminate or at least substantially reduce the corrosion problems while permitting easy and fast mounting of an aircraft seat (or similar element). Advantageously this fixation system will also be usable for establishing an electrical connection of the mounted furnishing component (or similar element) with an electrical system of the vehicle in question (especially an aircraft).

To this end it proposes a fixation system, intended in particular for fixation of a furnishing component in an aircraft, making it possible to join a substantially flat base of an element to be fixed to a top plate.

According to the present invention, this fixation system is provided with:
  at least one hole of elongated shape made in the top plate,
  a shaft extending substantially perpendicular to the base of the element to be fixed and mounted movable in rotation relative to its longitudinal axis,
  a fixation head integral with the shaft, of elongated shape matched to the shape of the hole made in the top plate and intended to be disposed on a first side of the base of the element to be fixed,
  control means for making the shaft pivot around its axis and intended to be disposed on a side of the base of the element to be fixed opposite the first side of the base.

The use of an oblong hole and of a fixation head of matching shape makes it possible to achieve fixation by simply introducing the fixation head through the corresponding hole and then pivoting the fixation head relative to the hole, for example by pivoting by one quarter turn.

To facilitate mounting and to assure good alignment of the pieces as well as good locking, the outside contour of the fixation head preferably corresponds substantially to the inside contour of the hole of elongated shape made in the top plate.

One embodiment of the invention provides that the control means for making the shaft pivot are provided with a lever screwed onto the shaft in a manner that can be held by a counter nut.

To limit looseness and to permit good locking while keeping the fixation head held down, one embodiment provides that elastic means preload the fixation head toward the base of the element to be fixed. The preloading means used are composed, for example, of an elastic washer disposed between the control means for making the shaft pivot and a bracing surface fixed relative to the base. The elastic washer is preferably a washer of PLI type (for PreLoad Indicating, or in French: indicator of preload) such as those disclosed in U.S. Pat. No. 3,323,403 or U.S. Pat. No. 3,867,865 or else U.S. Pat. No. 4,333,220.

According to a preferred embodiment of the fixation system according to the invention, the top plate is integral with a rail, in the interior of which there is housed a first electrical wire; the shaft is perforated to permit at least one second electrical wire to be passed through it, and connection means are mounted on the fixation head to permit the first electrical wire to be connected to the second electrical wire. In this way, when the mechanical connection is established and locked, it is simultaneously possible to establish an electrical connection of the mounted element without an additional operation during mounting.

In this preferred embodiment, the connection means are provided, for example, with an insulating board mounted on the fixation head in a manner facing the first electrical wire; the insulating board is integral with the fixation head and pivots together therewith; the insulating board also has an elongated shape, and a conductive land is disposed at one end of the insulating board, the said land being connected electrically to the second electrical wire.

According to another alternative embodiment, the connection means for permitting the first electrical wire to be connected to the second electrical wire are provided, for example, with a rigid contact, on the one hand connected to an electrical wire and on the other hand projecting at one end of the fixation head.

In a fixation system according to the present invention, the control means for making the shaft pivot are provided, for example, with a lever, and the fixation system is additionally provided advantageously with a cap intended to cover the base and the lever at least partly when the lever is in its position corresponding to the locked position of the fixation head. The cap makes it possible to assure protection of the fixation system, and, when its shape is appropriate, it may also be used to check that the element to be fixed is properly mounted. As an example, it can be provided that this cap can be mounted only if the lever or levers is or are in locked position.

The present invention also relates to an assembly provided with at least one aircraft seat, one fixation top plate and one fixation system, characterized in that the fixation top plate has a set of aligned holes of elongated shape at a predetermined pitch, and in that the fixation system is a fixation system such as described hereinabove.

The present invention also applies to an aircraft intended for transportation of passengers and having a cabin to accommodate the passengers, in which cabin there are disposed seats fixed to the cabin floor, characterized in that at least one seat is fixed by at least one fixation system such as described hereinabove.

The present invention also relates to an assembly provided with at least one aircraft stowage bin, one fixation top plate and one fixation system, characterized in that the fixation top plate has a set of aligned holes of elongated shape and in that the fixation system is a fixation system such as described hereinabove.

Finally, the present invention also applies to an aircraft intended for transportation of passengers and having a cabin to accommodate the passengers, in which cabin there are disposed stowage bins fixed to the cabin ceiling, characterized in that at least one stowage bin is fixed by at least one fixation system such as described hereinabove.

BRIEF DESCRIPTION OF THE DRAWINGS

Details and advantages of the present invention will emerge more clearly in the description hereinafter, provided with reference to the attached schematic drawings, wherein:

FIG. 4 is a cross-sectional view of a fixation device according to the present invention, FIG. 5 is a view from above of an assembly of two fixation devices such as that of FIG. 4, FIG. 6 is a side view of the assembly of FIG. 5.

FIG. 1 represents a rail 2, which in its illustrated embodiment is formed from a sectional member 4 and a top plate 6.

DETAILED DESCRIPTION OF EMBODIMENTS

Figure 2:
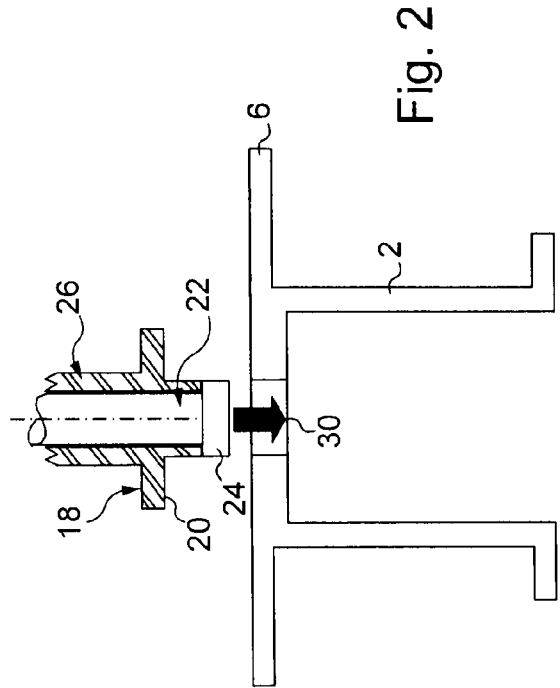
FIG. 2 is a schematic cross-sectional view illustrating one step of mounting with a fixation system according to the invention.

Sectional member 4 is generally Ω-shaped. It has two parallel side walls 8, which in the description hereinafter will both be considered to be vertical. In fact, in the case of an application to fixation of seats in an aircraft, side walls 8 are disposed in a vertical plane when the aircraft is on the ground. Similarly, it is supposed that the two side walls 8 are joined by a horizontal top wall 10. On the side opposite top wall 10, each side wall 8 has rebent flange 12 in the shape of a gutter extending outward from sectional member 4.

Top plate 6 is fixed against top wall 10. If rail 2 is made of the same material, it can be imagined that top plate 6 and top wall 10 are merged and therefore constitute only a single sectional member. In the preferred embodiment represented in FIG. 1, top plate 6 is made, for example, of a titanium alloy, to prevent any corrosion problem and to withstand the diverse mechanical aggressions, while sectional member 4 is made of an aluminum alloy to limit the total weight and the cost of rail 2. Fixation of top plate 6 on sectional member 4 can be achieved by mechanical assembly (by threaded joints or riveting, for example), but new welding techniques are also conceivable for assembling the two elements forming rail 2.

Figure 1:
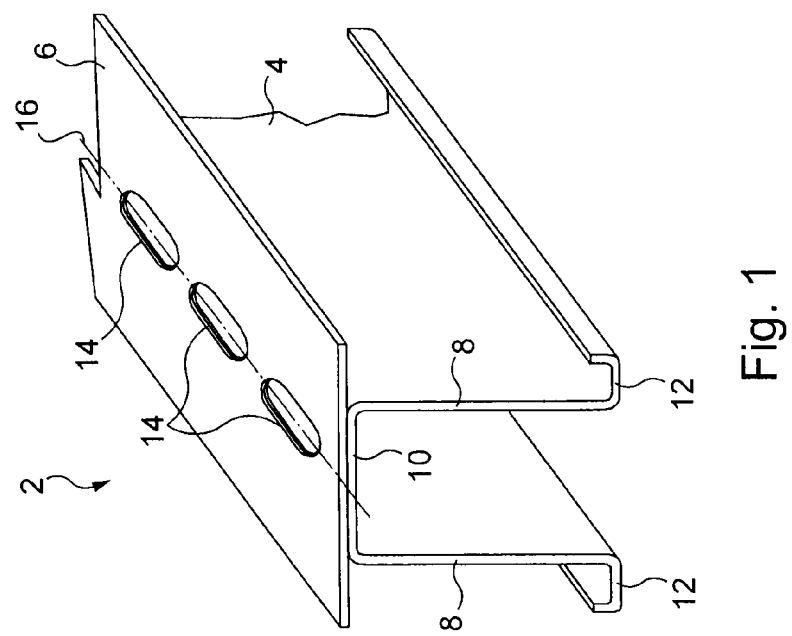
FIG. 1 illustrates a fixation rail than can be used in a fixation system according to the present invention.

As can be seen in FIG. 1, oblong holes 14 are made both in top plate 6 and in top wall 10. These oblong holes 14 have a longitudinal axis that coincides with longitudinal axis 16 of top plate 6. These oblong holes 14 are disposed at a regular pitch, such as 2.54 cm, along the entire length of top plate 6.

Figure 3:
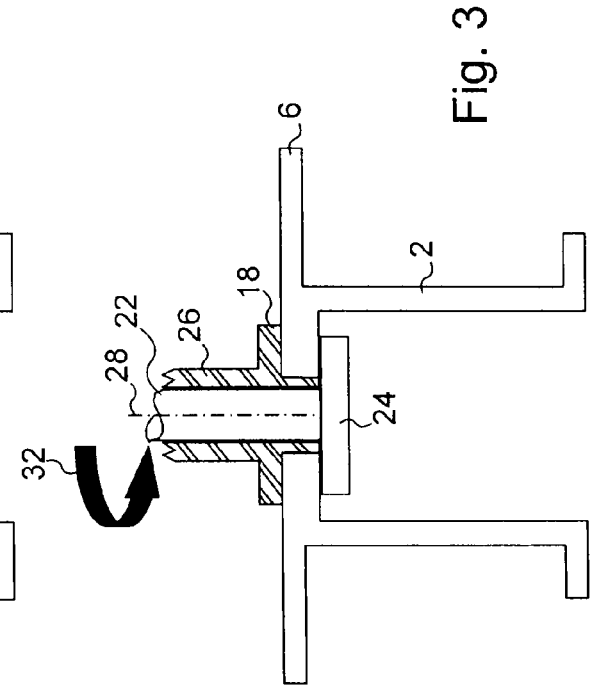
FIG. 3 is a view corresponding to FIG. 2 in a subsequent step of mounting.
Figure 7:
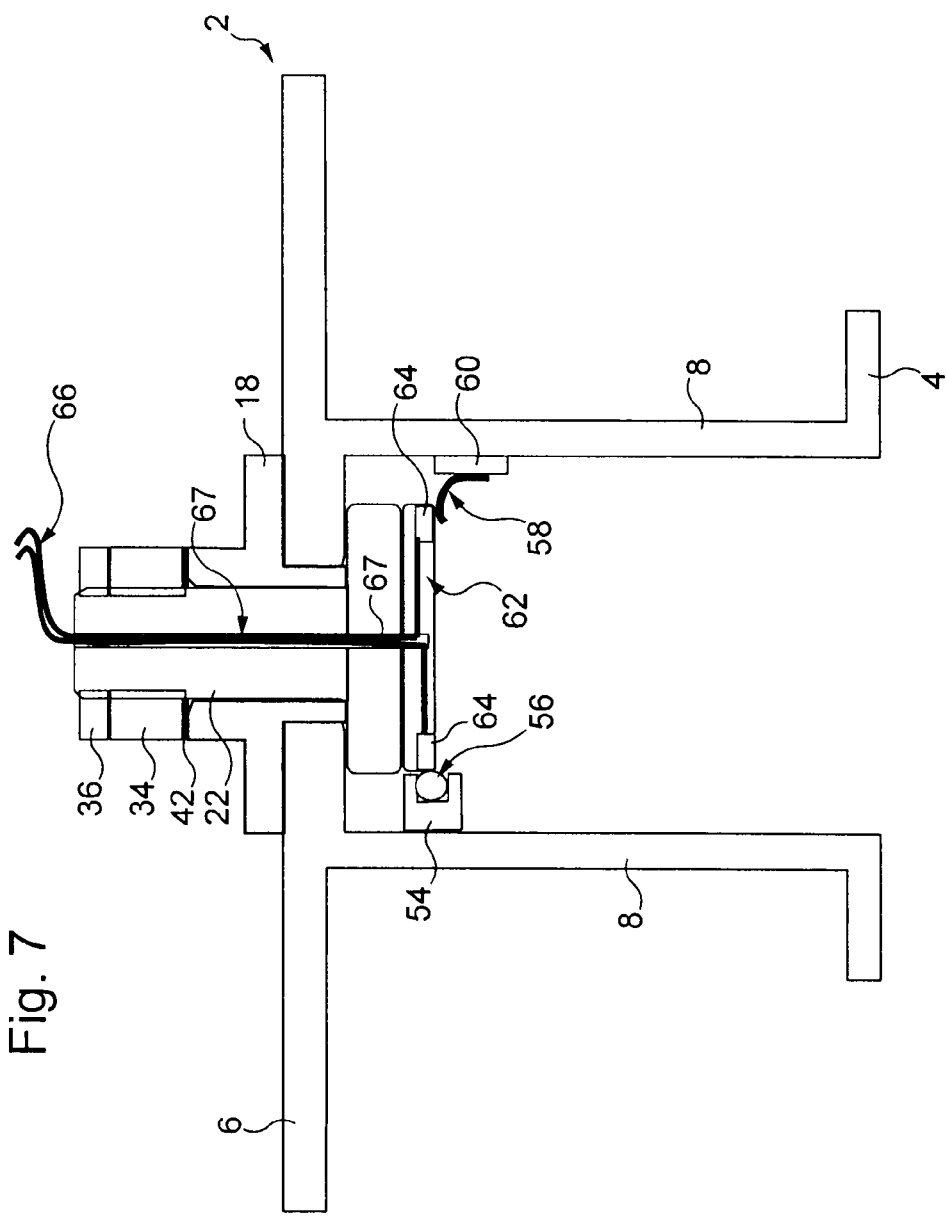
FIG. 7 is a cross-sectional view of a fixation system according to an alternative embodiment of the present invention.

In the following figures, rail 2 is considered as being a single piece, and these figures show only its contour in schematic manner. In FIGS. 2, 3 and 7, therefore, top plate 6 is not distinguished from top wall 10, and only reference 6 of the top plate is indicated.

FIGS. 2 and 3 schematically show the operation of a fixation system according to the present invention. Here it involves fixing a base 18 of an element to be fixed, for example a seat or any other "furnishing component" traditionally fixed to the floor of a vehicle, and more particularly an aircraft. This base 18 has a flat face 20, which is intended to be braced on top plate 6 of rail 2. For example, it is made by machining from a bar or thick sheet of aluminum alloy.

The fixation system is provided with a fixation device provided with a shaft 22 equipped at one of its ends with a fixation head 24. Shaft 22 is mounted in a bearing 26 in such a way that it can pivot around an axis of rotation 28 perpendicular to flat face 20 of base 18. Each shaft 22 is made, for example, from high-tensile stainless steel. Bearing 26 extends on both sides of flat face 20 and has a circular cross section. Its inside diameter is matched to the outside diameter of shaft 22. The outside diameter of bearing 26 below flat face 20 is matched to the width of oblong holes 14, measured perpendicular to longitudinal axis 16. Above flat face 20, the outside diameter of the bearing may be different from its outside diameter below flat face 20.

Fixation head 24 is integral with shaft 22 and forms only one single piece therewith. It has a shape corresponding to that of oblong holes 14, or in other words a substantially elongated shape of the same length and same width as oblong holes 14, and such that a fixation head 24 is able to pass freely through an oblong hole 14.

To achieve fixation with the aid of the fixation system shown in FIGS. 2 and 3, fixation head 24 is oriented so that it can pass freely into an oblong hole 14 of rail 2, then pass through oblong hole 14 as symbolized by arrow 30 in FIG. 2. The fixation system is dimensioned in such a way that, when flat face 20 of base 18 rests on top plate 6, fixation head 24 is located just on the other side of oblong hole 14. Thus, by turning shaft 22 as suggested by arrow 32, shaft 22 drives fixation head 24, which is able to turn freely. By virtue of the elongated shape of oblong hole 14 and of fixation head 24, this rotation, by 90°, for example, will prevent any extraction movement and will assure that base 18 is held on top plate 6. The fixation system is then in locked position.

FIGS. 2 and 3 are schematic diagrams, and FIGS. 4 to 6 show a first embodiment of a fixation device for a fixation system according to the present invention.

Diverse elements of FIGS. 2 and 3 are recognized in FIGS. 4 to 6. Thus there are a base 18 having a flat face 20, two shafts 22, each mounted in a bearing 26, and a fixation head 24 integral with each shaft 22.

Each shaft 22 is externally threaded on the side opposite fixation head 24. The externally threaded end carries a lever 34 held on shaft 22 by a nut 36. Lever 34 is provided with a control arm 38 and a mounting head 40. The latter is internally threaded so that it can be screwed onto the externally threaded end of a shaft 22, and control arm 38 extends in a plane substantially perpendicular to the axis of the internal thread of mounting head 40. In the embodiment shown in the drawings, control arm 38 is substantially tangential to mounting head 40, which has substantially circular shape. Other embodiments can be envisioned. The idea is to have gripping means with which rotation of shaft 22 can be easily controlled. The lever can be made, for example, of aluminum-base alloy, while nut 36 is, for example, a steel nut.

This mounting system of lever 34 could be replaced by another mounting system. Instead of being externally threaded, the end of shaft 22 could have, for example, a tongue, which would correspond with a groove implemented in mounting head 40 of the lever (or else the tongue could be provided in the mounting head and the groove in the shaft).

Bearing 26 is also used as a stop, on the one hand for fixation head 24 and on the other hand for lever 34. The height of bearing 26 below flat face 20 corresponds substantially to the depth of oblong hole 14 of rail 2. Fixation head 24 becomes braced against bearing 26. To assure such bracing, an elastic washer 42 is disposed between bearing 26 and lever 34. Elastic washer 42 is preferably a washer of PLI type (for PreLoad Indicating, or in French: indicator of preload), such as those disclosed in U.S. Pat. No. 3,323,403 or U.S. Pat. No. 3,867,865 or else U.S. Pat. No. 4,333,220. This elastic washer 42 makes it possible to assure upwardly directed preloading of shaft 22 and to eliminate any mounting looseness by absorbing dimensional variations such as thickness tolerances of rail 2, and more precisely of top plate 6 and top wall 10.

Figure 8:
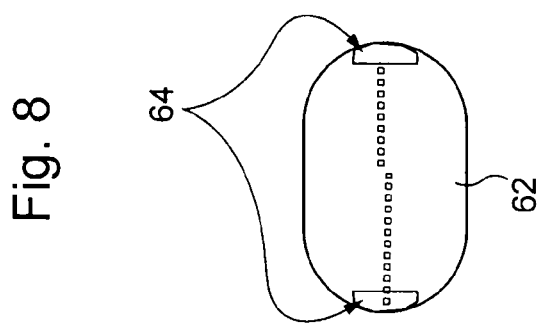
FIG. 8 is a schematic view from below of a piece of FIG. 7.

In the illustrated embodiment, base 18 comprises a plate and a rib. Taking the orientation defined above into account, this plate is referred to hereinafter as horizontal plate 44 and the rib is referred to as vertical rib 48. Horizontal plate 44 has the overall shape of an elongated rectangle (see FIG. 5), and its lower face corresponds to flat face 20. Thus horizontal plate 44 has a longitudinal axis 46. Both shafts 22 of the fixation system extend perpendicular to this longitudinal axis, and their axis of rotation 28 intersects this longitudinal axis 46. Vertical rib 48, with the overall shape of a triangle (see FIG. 6), is mounted perpendicularly on a median line of horizontal plate 44. A window 50 is provided in vertical rib 48 for each of shafts 22 and corresponding levers 34. As can be seen in FIG. 8, vertical rib 48 has a bore 52 permitting fixation of base 18 with an element to be fixed, such as a seat (not illustrated). Of course, a plurality of bases such as base 18 are used to assure fixation of a seat. There can be used, for example, two bases with two shafts 22 and two bases with a single shaft 22 for the rear and front respectively of the seat. This is known to those skilled in the art and is not described in more detail here.

As can be noted by observing FIGS. 5 and 6, levers 34 are advantageously mounted in such a way that a control arm 38 of a lever 34 extends substantially perpendicular to vertical rib 48 when the corresponding fixation head 24 is aligned with vertical rib 48 and with longitudinal axis 46 of horizontal plate 44. In this way, when a control arm 38 is located in a position parallel to vertical rib 48, the corresponding fixation head 24 is oriented perpendicular to vertical rib 48 and to longitudinal axis 46. During a mounting operation, once base 18 is placed on top plate 6, fixation heads 24 being introduced into the corresponding rail 2, the position of these fixation heads 24 that are no longer visible can be easily determined. Thus, when a fixation device is in locked position, the corresponding control arm 38 becomes integrated into the system and no longer forms a projection. The system then has compact form.

FIGS. 7 to 10 show an alternative embodiment of the fixation system of FIGS. 4 to 6. In this embodiment, the fixation system also makes it possible to establish an electrical connection of the seat (or similar element). This embodiment includes all of the mechanical elements described above. The references already used for the first embodiment of FIGS. 4 to 6 are also adopted for the description of FIGS. 7 to 10.

In this case rail 2 also functions as the housing for electrical conductors. Two conductors of different types are shown in FIG. 7. On the left of FIG. 7, side wall 8 of sectional member 4 of rail 2 carries a cable duct 54, which extends longitudinally in rail 2. This cable duct 54, made of insulating material and of appropriate size, receives a first electrical conductor 56. On the right of FIG. 7, side wall 8 of sectional member 4 of rail 2 carries a second electrical conductor 58. In the illustrated embodiment, this latter conductor has the form of a conductive strip or of a ribbon conductor. This second electrical conductor 58 is fixed on the inside face of corresponding side wall 8 by way of an insulating support 60. By way of illustration, FIG. 7 shows two separate types of conductors on the same fixation system. In practice, however, one or the other of these conductors will generally be found in the same rail. These electrical conductors make it possible to connect the seat (or similar element) to the electrical circuit of the vehicle in which it is mounted. In the case of an aircraft, it will be possible in this way for the seat to be connected to the electrical system and thus, for example, to provide it with lighting, with a power outlet, etc. It also will be possible for it to be connected to the IFE (English acronym for "In-Flight Entertainment") multimedia system provided in an aircraft for entertainment of the passengers during a flight. By using the carrier current, it may even be connected to both the electrical system and the IFE system by the same cable.

Fixation head 24 of the fixation system is equipped with an insulating board 62, which is fixed to fixation head 24 on the side opposite shaft 22. Fixation of insulating board 62 can be achieved, for example, by adhesive bonding or by crimping. This insulating board 62 has the same contour, viewed from above or below, as fixation head 24 (see FIGS. 7 and 8). At each of its ends, insulating board 62 carries a conductive land 64, each conductive land 64 being mounted in such a way that it is electrically insulated from fixation head 24 (see FIG. 7).

Inside insulating board 62, channels are provided to receive electrical wires 66. These channels connect each of the conductive lands to the center of insulating board 62, on the side of fixation head 24. The latter as well as the corresponding shaft 22 each have a central longitudinal bore 67 traversing from one side to the other and intended to guide electrical wires 66 connected to conductive lands 64. The seat (or similar element) can then be supplied with electricity via these electrical wires 66.

The positioning of first electrical conductor 56 and of second electrical conductor 58 in rail 2 is achieved in such a way that electrical contact is established between a conductive land 64 and the corresponding conductor when the corresponding fixation device is in locked position, fixation head 24 having pivoted by 90° relative to its position allowing its introduction into a corresponding oblong hole 14. In contrast, when the corresponding fixation device is in unlocked position, no electrical contact is established between the conductors situated in rail 2 and electrical wires 66. In addition, the electrical conductors have a certain elasticity, either within the conductor itself or within cable duct 54 or insulating support 60, so that they can adapt to the positioning variations that the fixation device may comprise.

Conductor 56 and/or conductive land 64 may be coated with a self-sealing material. This is a material of the type used, for example, to make sheaths for supply cables of halogen lamps suspended between two supply cables. This type of material is also found, for example, in fuel tanks of military aircraft. When a perforation is made to establish an electrical connection in such a material, once the connection is broken, the material repairs itself and makes it possible to ensure that the integrity of sealing of the conductor and/or of the conductive land is restored.

The established electrical connection may be used to check the mechanical locking. As long as the electrical connection has not been established, it is considered, for example, that mechanical locking has not been established. It is then possible to provide electrical connections on all fixation devices or else, as represented in FIG. 9, only on one fixation device per seat or per assembly of fixation devices.

Figure 9:
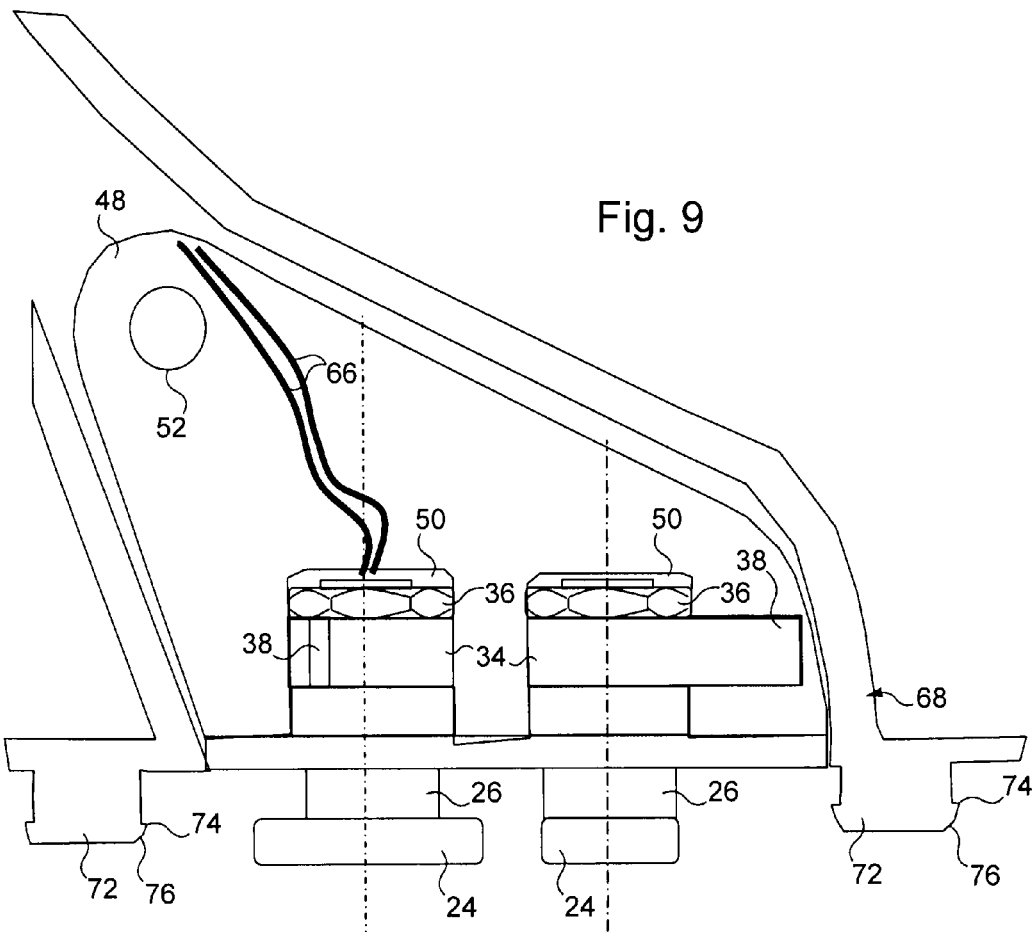
FIG. 9 shows schematically in side view the system of FIG. 7 covered by a cap.
Figure 10:
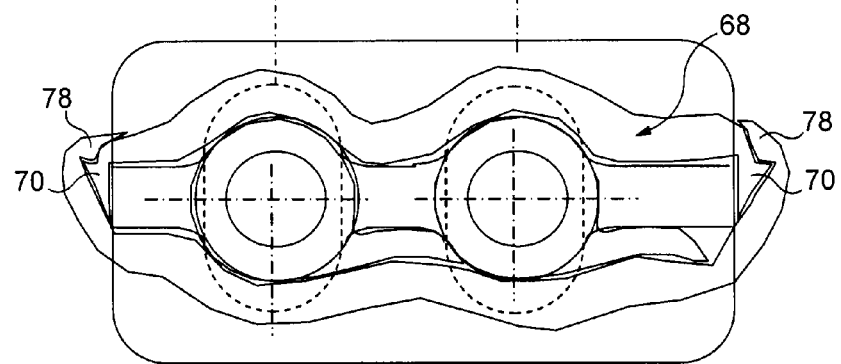
FIG. 10 is a view from above corresponding to FIG. 9.

FIGS. 9 and 10 show the fixation device of FIGS. 7 and 8 equipped with a protective cap composed of two shells 68. This protective cap makes it possible to assure insulation of base 18 and of part of top plate 6 of the corresponding rail. This base 18 and this top plate 6 indeed may be provided to assure the return path for currents arriving via the conductor(s) disposed in rail 2.

The cap also makes it possible to guide electrical wires 66 to the seat (or more generally to the element fixed to the floor).

In the illustrated embodiment, in which levers 34 are used to control locking and unlocking of the fixation systems, shells 68 assume the shape of base 18 and levers 34 when these are in their locked position, or in other words when control arms 38 are held down against vertical rib 48 of base 18. As can be seen for the preferred embodiment illustrated in FIG. 10, the two shells 68 are preferably separate. A first shell 68 comes to conform to the face of base 18 which is not provided with control arms 38. This first shell 68 has, on the one hand, arms 70 oriented toward second shell 68 and, on the other hand, feet 72 (FIG. 9), which are each intended to be lodged in an oblong hole 14 of rail 2 and to establish fixation of the shell by snap action. The snap action takes place by means of a tooth 74 and a chamfer 76 provided on each foot 72. Second shell 68 in turn comes to conform to the shape of base 18 on the side of control arms 38. It has arms 78 which come to embrace arms 70 of first shell 68. Snap action is also provided for mounting the second shell on the first.

As an example, shells 68 are made by molding from a semi-rigid thermoplastic resin. As is evident from FIG. 10 in particular, it is noted that, in the illustrated preferred embodiment, shells 68 can be assembled only if control arms 38 of levers 34 are in their locked position, and therefore only if mechanical locking is optimum (meaning that fixation heads 24 are pivoted by 90° relative to their orientation allowing them to be introduced into oblong holes 14).

Figure 11:
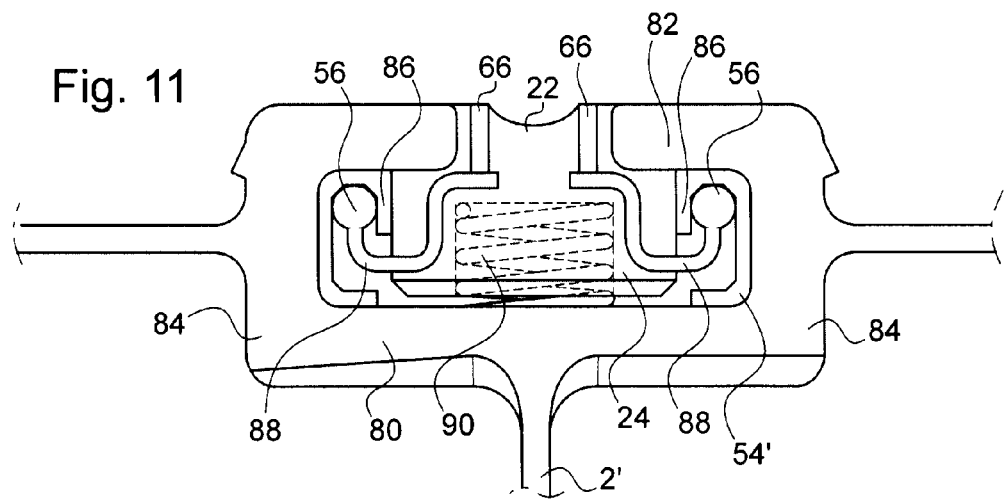
FIG. 11 is a cross-sectional view of an alternative embodiment of a connection system for a fixation system according to the present invention.

FIG. 11 shows a preferred embodiment making it possible to establish an electrical connection at the same time as the fixation of an element such as a seat or a stowage bin is achieved, This alternative embodiment makes it possible on the one hand to protect the electrical conductors effectively from humidity problems and on the other hand to provide a compact connection and fixation system.

In the present embodiment, there are two electrical conductors similar to the electrical conductors denoted by reference 56 in FIG. 7. This same reference is therefore adopted here. These conductors 56 are disposed in the interior of a tubular part 80 of a rail 2', partially shown here. Tubular part 80 has rectangular cross section and it is intended to receive a fixation system according to the present invention. To receive such a system, as indicated in the foregoing, it is appropriate to provide oblong holes 14. The latter are made in a wall of tubular part 80 that will be referred to hereinafter as top wall 82 and that fulfills the function of a top plate in the manner of top plate 6 described in the foregoing. Just as the oblong holes of FIG. 1 are clearly separated from one another, the oblong holes 14 made in top wall 82 of tubular part 80 are separate and do not meet. Thus there is no continuous slot in top wall 82, but a succession of oblong holes 14, between which material is present.

In tubular part 80, electrical conductors 56 are each mounted in a cable duct 54' made of insulating material. Thus electrical conductors 56 are insulated from tubular part 80, which in this case is presumed to be made of aluminum or of an aluminum alloy. Electrical conductors 56, having almost the thickness of cable duct 54', are each located in an angle formed by top wall 82 of tubular part 80 and by a side wall 84 of tubular part 80 close to top wall 82.

Thus, assuming that top wall 82 is disposed in upper position relative to rail 2 and to its tubular part 80, conductors 56 are disposed high in the hollow part of tubular part 80. Thus, by virtue of their position, the electrical conductors are protected from humidity.

The shape of each cable duct 54' is adapted for even better protection from humidity. It is noted that each cable duct 54' is provided with a rebent flange 86 extending parallel to side walls 84 over the entire height of electrical conductor 56. This rebent flange 86 then forms a barrier that protects the corresponding electrical conductor 56. In fact, liquid can penetrate into the interior of tubular part 80 only from oblong holes 14. In this way each rebent flange 86 forms a barrier between oblong hole 14 and the corresponding electrical conductor 56. In addition, each rebent flange forms a drip-proof lip that therefore protects the corresponding electrical conductor 56. To perfect the protection of electrical conductors 56 against humidity, it is preferable to provide, in the wall of tubular part 80 opposite top wall 82, holes for evacuation of liquid (not illustrated).

A fixation head 24 mounted at the end of a shaft 22 is seen on FIG. 11.

As in the embodiment of FIG. 7, electrical wires 66 traversing shaft 22 are found here. At fixation head 24, each of the two electrical wires 66 is connected to a rigid contact 88. Rigid contacts 88 are disposed at the ends of fixation head 24. They are of general U-shaped form, the base of the U extending parallel to top wall 82. A first branch of the U of each electrical contact 88 is disposed in the interior of fixation head 24 and is connected to an electrical wire 66. The other branch of the U of each rigid contact 88 in turn extends outside fixation head 24 while being oriented toward top wall 82. As illustrated in FIG. 11, each rigid contact 88 has a shape such that, when fixation head 24 is in its locked position, the free end of the rigid contact becomes braced against the corresponding electrical conductor 56. In this embodiment, an advantageous alternative provides that electrical conductor 56 and/or rigid contact 88 are coated with a self-sealing material, as described above with reference to FIG. 7.

In the embodiment of FIGS. 4 to 10, an elastic washer 42 is provided to assure upwardly directed preloading of shaft 22. The embodiment of FIG. 11 provides, as a replacement for washer 42 or as a complement thereto, the presence of a spring 90, which is braced against the bottom of tubular part 80 opposite top wall 82 and which comes to urge fixation head 24 against the inside face of top wall 82. This spring 90 therefore also acts in a manner that favors good contact between rigid contacts 88 on the one hand and electrical conductors 56 on the other hand.

The fixation system described hereinabove exhibits several advantages compared with the systems usually used on board aircraft.

Mounting and demounting of a seat (or of another element to be fixed on rails) does not necessitate any tool and is accomplished in two operations. It permits time savings compared with traditional mounting solutions. In addition, when the system is equipped with the protective cap, it has means making it possible to be sure that locking of the seat (or other element) has indeed been achieved. The electrical connections may also be used to verify that the seat (or other element) has been properly mounted mechanically.

The extra weight of the proposed solution compared with a traditional solution in which a rail is topped by a track is at least partly compensated by the elimination of the extra material represented by the track. If the rail is made of both aluminum and titanium (for the top plate), the extra weight is acceptable.

The proposed solution makes it possible to eliminate the risk of corrosion. Firstly, in the solution shown in FIGS. 9 and 10, the base used for fixation is protected from the potentially humid environment by the protective cap. Then, pooling of liquid is avoided by elimination of the prior art track, and any liquids that may be present are drained through the oblong holes made in the rail. Finally, the top face of the rail, the top plate, site of the corrosion, is made of titanium (or of titanium-base alloy).

The proposed fixation system permits not only routing of cables in the fixation rail but also electrical connection of the seat (or other element). In addition, the electrical connection is established in the actual course of the operation of mechanical fixation. No additional specific action is provided for establishing the electrical connection of elements fixed on the rail.

In the case of an aircraft whose fuselage is made of composite material that does not conduct electricity, the fixation rail may be used to form the return path for the current arriving at the seats (or other elements). Thus it is not necessary to provide a separate current-return path.

Finally, the proposed fixation system can be adapted to prior art seats. In fact, the interface, composed of bore 52, between the seat and the fixation system is common to the solution described here and to the prior art seats. The adoption of this fixation system therefore does not necessitate any modification of the seats: only the fixation devices have to be changed.

A fixation system according to the present invention may also be used to fix other elements to the floor of an aircraft cabin. It may also be used advantageously for fixation of stowage bins in the upper part of an aircraft cabin. The lower face of stowage bins is most often equipped with a light, with a system for calling the commercial flight crew, the indicator light relating in particular to the on-board safety of the aircraft and possibly with screens, indicators, etc. All of these elements must be powered and cabling must be provided. A fixation system such as described hereinabove makes it possible to achieve fixation of a stowage bin and to establish its electrical connection at the same time.

Figure 12:
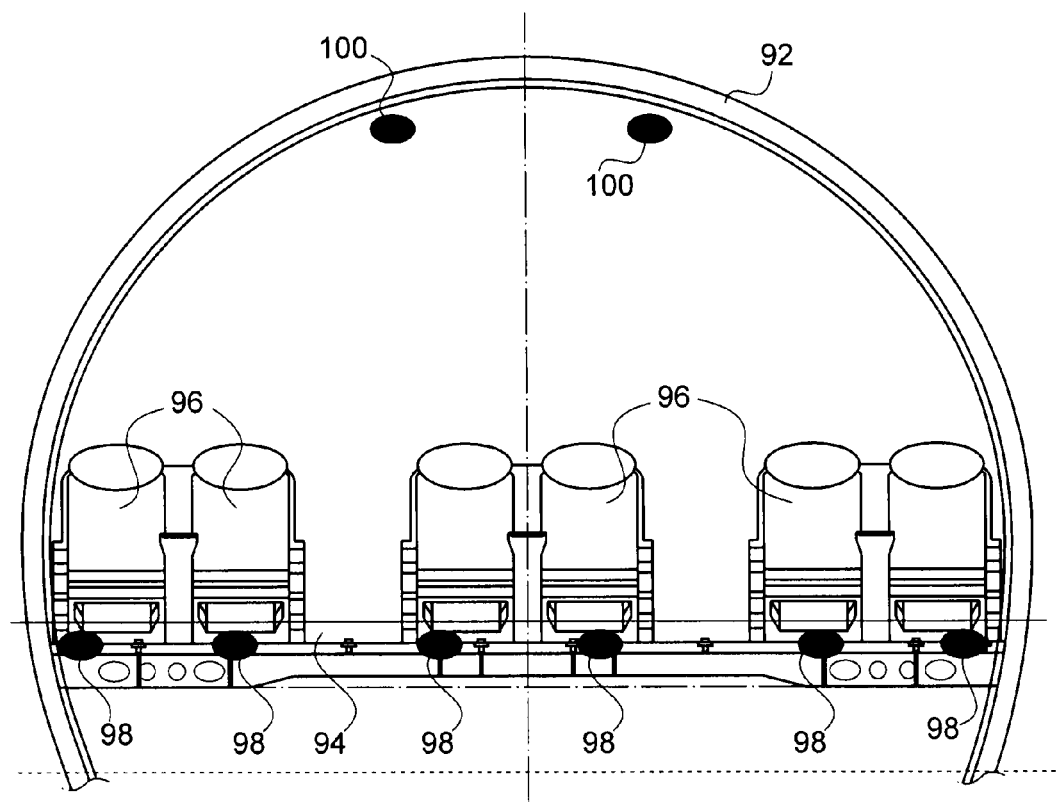
FIG. 12 is a cross section of an aircraft cabin illustrating the possible positioning of rails for receiving fixation systems according to the present invention.

FIG. 12 illustrates the positionings that can be envisioned in an aircraft cabin for placing top plates (or tubes) for fixation of elements with a fixation system according to the present invention. Preferably the fixation systems used also make it possible to establish an electrical connection, at least for some of them.

On FIG. 12 there is seen in cross section an aircraft fuselage 92, with a deck 94 and seats 96 fixed to the deck. Zones 98 under the seats are provided for fixation of seats 96, while also establishing their electrical connection. At the cabin ceiling, zones 100 are provided in turn for fixation and electrical connection of stowage bins (not illustrated).

A fixation system according to the present invention may also find an application in other parts of an aircraft, especially in the hold. In that part of the aircraft, a fixation system according to the invention, whether or not establishing an electrical connection, may be provided for fixation of diverse furnishing components, such as electrical cabinets.

The present invention is not limited to the preferred embodiment and its alternatives described hereinabove by way of non-limitative examples. It also relates to all alternative embodiments within the capacity of those skilled in the art within the scope of the claims hereinafter.

The invention claimed is:

1. A fixation system, intended in particular for fixation of a furnishing component in an aircraft, making it possible to join a substantially flat base of an element to be fixed to a top plate, comprising:
   at least one hole of elongated shape made in the top plate;
   a shaft extending substantially perpendicular to the base of the element to be fixed and mounted movable in rotation relative to its longitudinal axis;
   a fixation head integral with the shaft, of elongated shape matched to the shape of the hole made in the top plate such that an outside contour of the fixation head corresponds substantially to the inside contour of the hole made in the top plate, wherein the fixation head is intended to be disposed on a first side of the base of the element to be fixed; and
   control means for making the shaft pivot around its axis and intended to be disposed on a side of the base of the element to be fixed opposite the first side of the base,
   wherein a top surface of the fixation head is substantially planar, and when the furnishing component is fixed in an aircraft, the substantially planar top surface of the fixation head is engaged with a substantially planar engaging surface of the top plate.

2. A fixation system according to claim 1, wherein the control means for making the shaft pivot are provided with a lever screwed onto the shaft.

3. A fixation system according to claim 2, wherein the lever screwed onto the shaft is maintained by a counter nut.

4. A fixation system according to claim 1, wherein elastic means preload the fixation head toward the base of the element to be fixed.

5. A fixation system according to claim 4, wherein the preloading means are composed of an elastic washer disposed between the control means for making the shaft pivot and a support surface fixed relative to the base.

6. A fixation system according to claim 1, wherein the top plate is integral with a rail, in the interior of which there is housed a first electrical wire, in that the shaft is perforated to permit at least one second electrical wire to be passed through it, and in that connection means are mounted on the fixation head to permit the first electrical wire to be connected to the second electrical wire.

7. A fixation system according to claim 6, wherein the connection means are provided with an insulating board mounted on the fixation head facing the first electrical wire, in that the insulating board is integral with the fixation head and pivots together therewith, in that the insulating board also has an elongated shape, and in that a conductive land is disposed at one end of the insulating board, the said land being connected electrically to the second electrical wire.

8. A fixation system according to claim 6, wherein the connection means for permitting the first electrical wire to be connected to the second electrical wire are provided with a rigid contact, on the one hand connected to an electrical wire and on the other hand projecting at one end of the fixation head.

9. A fixation system according to claim 7, wherein a first electrical wire is coated with a self-sealing material.

10. A fixation system according to claim 8, wherein the rigid contact is coated with a self-sealing material.

11. A fixation system according to claim 1, wherein the control means for making the shaft pivot are provided with a lever, and in that the fixation system is additionally provided with a cap intended to cover the base and the lever at least partially when the latter is in its position corresponding to the locked position of the fixation head.

12. An assembly provided with at least one aircraft seat, one fixation top plate and one fixation system, wherein the fixation top plate (6) has a set of aligned holes of elongated shape at a predetermined pitch, and in that the fixation system is a fixation system according to one of claims 1 to 2.

13. An aircraft intended for transportation of passengers and having a cabin to accommodate the passengers, in which cabin there are disposed seats fixed to a cabin floor, wherein at least one seat is fixed by at least one fixation system according to one of claims 1 to 2.

* * * * *